(No Model.) 2 Sheets—Sheet 2.
Z. B. COES.
TAPER TURNING TOOL FOR LATHES.
No. 527,140. Patented Oct. 9, 1894.
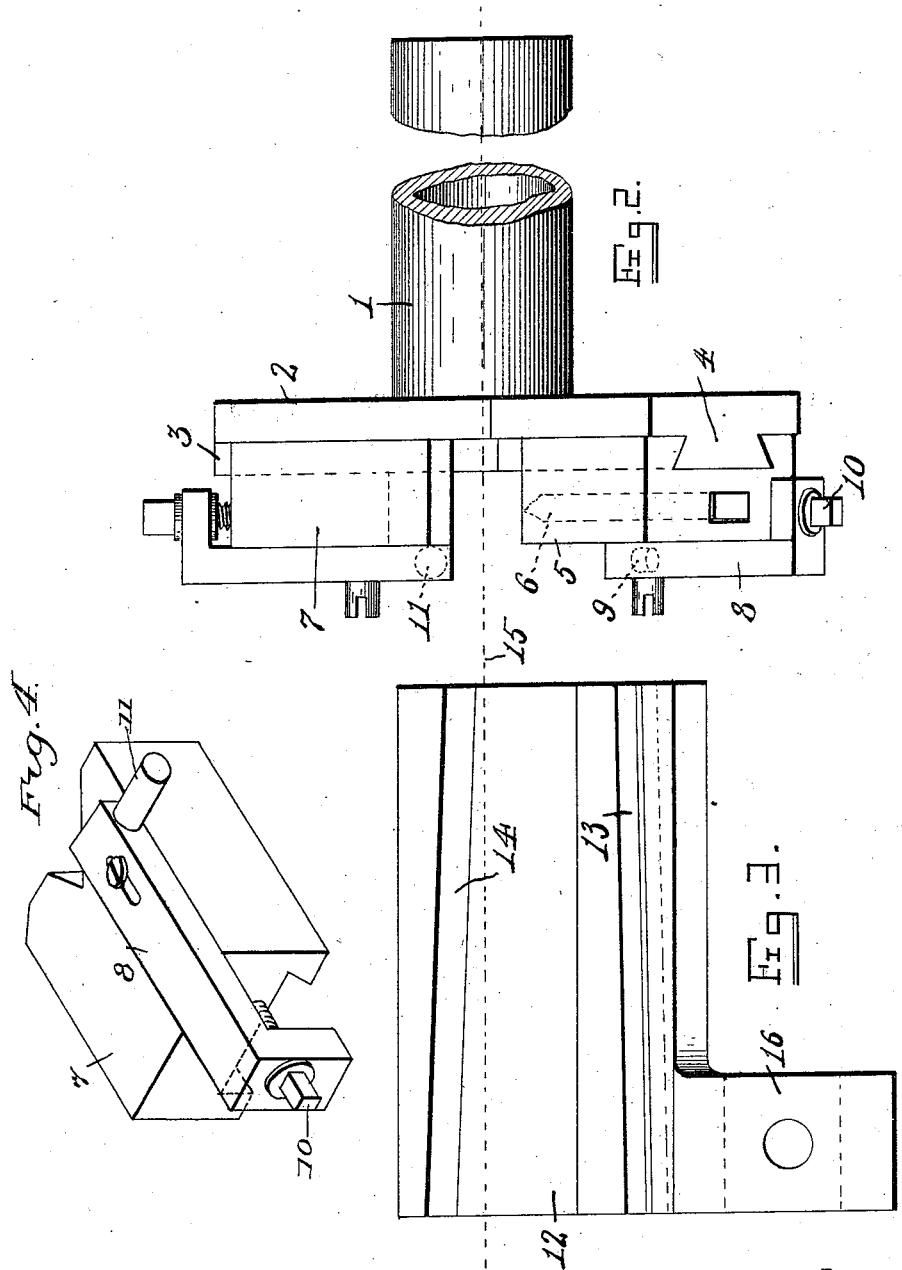

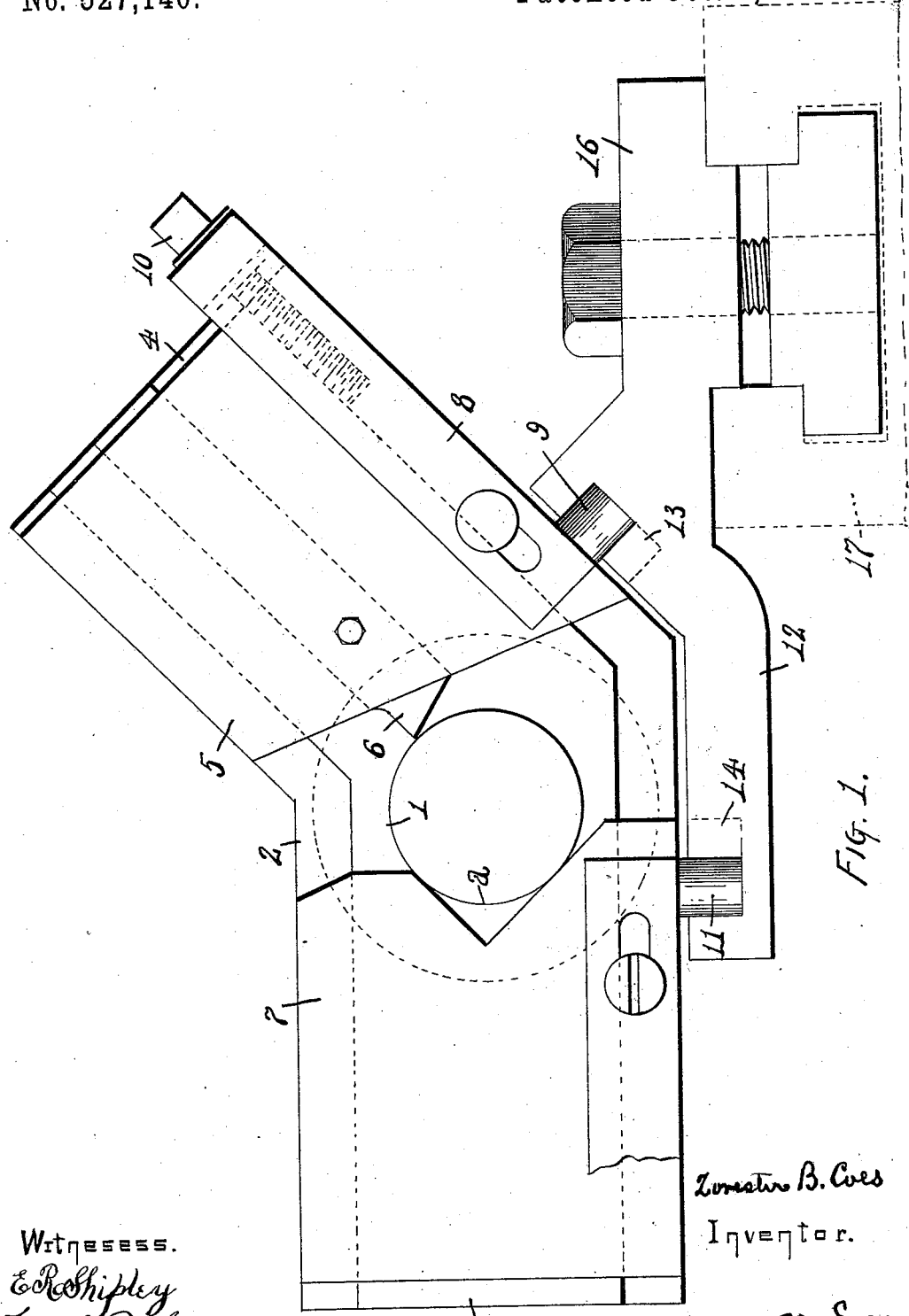

UNITED STATES PATENT OFFICE.

ZORESTER B. COES, OF HAMILTON, OHIO, ASSIGNOR TO THE NILES TOOL WORKS COMPANY, OF SAME PLACE.

TAPER-TURNING TOOL FOR LATHES.

SPECIFICATION forming part of Letters Patent No. 527,140, dated October 9, 1894.

Application filed May 7, 1894. Serial No. 510,302. (No model.)

*To all whom it may concern:*

Be it known that I, ZORESTER B. COES, of Hamilton, Butler county, Ohio, have invented certain new and useful Improvements in Taper-Turning Tools for Lathes, (Case A,) of which the following is a specification.

This invention pertains to that class of taper turning tools designed to be carried by the sliding tailstock of a lathe, or by the turret of a turret-lathe, and to be fed forward to operate upon work revolved by the lathe spindle.

My improvements will be readily understood from the following description taken in connection with the accompanying drawings, in which—

Figure 1, is an end view of a taper turning tool exemplifying my invention; Fig. 2, a plan of that portion of the structure which is supported and fed forward by the tailstock or turret of the lathe; Fig. 3, a plan of that portion of the structure which is held stationary, as by being bolted fast to the tool carage of the lathe; and Fig. 4 a perspective view of the back-rest jaw and its adjusting bar. Fig. 1 is upon a larger scale than Figs. 2 and 3 and is a view looking from the left of Figs. 2 and 3.

In the drawings:—1, indicates a shank adapted to be held in one of the holes in an ordinary turret lathe, this shank being bored to permit the passage of the work axially into or through it; 2, a plate formed upon the end of the shank and, when the structure is in use in a lathe, presenting itself toward the spindle of the lathe, which spindle will carry the bar on which the work is to be done in the manner usual with screw machines or turret lathes; 3, a slide-way on the plate 2, at right angles to the axis of the shank; 4, a second slide-way on the plate in the same vertical plane as the slide-way 3, but with its line of pathway disposed at an angle of forty-five degrees to the line of pathway of slide-way 3; 5, a tool-holding block arranged to slide upon the slide-way 4; 6, the cutting tool clamped in block 5 and presenting a single cutting point toward the axis of the shank of the structure, the point of the tool being carried by the block, as the block slides, in a line radial to the axis of the shank which will be the axis of the revolving work upon which the cutting tool is to act; 7, a narrow back-rest block sliding upon the slide-way 3 and having in its inner end, opposite the tool-point, a steadying notch whose walls are at an angle of ninety degrees to each other, this notch thus formed in or carried by the block 7 being designed to engage the revolving work upon which the cutting tool is to operate, and furnish the steadying back-stay for the work 8, an endwise adjustable bar mounted upon each of the blocks 5 and 7, parallel with the slideways which support the blocks; 9, a pin or roller projecting from the bar 8; 10, screws engaging the bars and blocks and serving as means by which, the bars being held by the guide-grooves, the blocks may be adjusted with reference to the axis of the work; 11, a second pin or roller connected in the same way with block 7; 12, a guide-plate fixedly supported under the structure carried by the shank and having a length equal to the maximum length of taper to be turned; 13, a longitudinal guide-groove in the guide-plate 12, in position to be transversed by the pin 9 of the tool-block, this guide-groove being arranged at such traverse angle to the axis of the shank as will correspond with the taper desired to be produced upon the work in hand; 14, a second longitudinal guide-groove in the guide-plate in position to be traversed by the pin 11 of the back-rest, this guide-groove also being arranged at a transverse angle to the axis of the shank, the transverse angle of this second guide-groove having a certain peculiar relationship to the transverse angle of groove 13, as hereinafter explained; 15, (Figs. 2 and 3,) the vertical plane of the axis of the shank, and, consequently, of the axis of such revolving piece as is to have the taper turned upon it; 16, a lug by means of which the guide-plate may be bolted to the usual lathe-carriage or tool-post block; and 17, the usual tool-post block of the lathe-carriage, it being understood that when the apparatus is in use the tool-carriage will remain stationary upon the lathe-bed.

The guide-plate is to be secured to the lathe-bed against endwise motion by any suitable means and the suggested plan of securing it to the lathe carriage will be found satisfactory and perhaps preferable.

Disregarding the back-rest block 7 it will be apparent that as the structure carried by the shank is fed, as by the lathe turret, toward the head of the lathe and over the end of a revolving piece, the cutting-tool will traverse that revolving piece, taking the depth of cut for which the cutting-tool has been adjusted, and that as the cutting-tool feeds to the left the guide-groove 13 will cause the cutting-tool to move outwardly, thus producing upon the work a taper corresponding with the transverse angle of guide-groove 13; and it is obvious that screws 10 may be employed in adjusting the tool and back-rest block inwardly and outwardly to secure the desired size of work. With work of comparatively large diameter and stiff enough to withstand the transverse strains due to the cutting then a back-rest may not be needed; but with work of small diameter, or of considerable length, a back-rest must be provided. If the back-rest were a plain flat surface bearing upon the work as the chord of the circle then of course it would be necessary to give to the back-rest an in and out movement to the same degree as the cutting-tool, and the guide-groove 14 which is to control the movement of the back-rest would need the same transverse angle as that which controlled the cutting-tool; but the flat back-rest, representing the single chord of the circle, is inefficient and it is found in practice in general lathe work that a back-rest must have the form of a notch to engage the work. In the illustration the back-rest has the notch, and it bears upon and gives steadying support to the work in two directions; but the employment of this notch introduces difficulties, for as the notch feeds along the tapered work, the work will seat farther back in the notch as the diameter becomes smaller. Look at Fig. 1 and assume that the back-rest 7 carried a tool whose cutting point engaged the work at $a$. Such a tool would produce a taper upon the work in direct proportion as block 7 thus carrying it was moved radial to the work but the contact points of the walls of the notch would not move radially to the same degree and, consequently, there would always be a change of relationship between the radius of the circle produced by the cutting-tool and the radius of the circle to which the notch-walls are tangent, and consequently contact and steadying support could not be maintained. The back-rest and the tool must therefore move radially at different rates. Tool point 6 is diametrically opposite one of the tangential notch-walls and that notch-wall must approach and recede from the center of the work at the same rate as the tool point. The tool point moves in a direct radial line and the notch-wall does not do so. The angle of the notch-wall is forty-five degrees to the line of travel of the notch-wall and consequently notch-wall movement must be to tool point movement as the diagonal of a square is to the side of a square, or as one and forty-one one-hundredths is to one. In other words if back-rest block 7 carried a tool whose point engaged the work at $a$ it would be necessary, in order to maintain contact of the notch-walls on varying diameters produced by such tool point, to advance the tool point and block independently at rates proportioned as one is to one and forty-one one-hundredths. The transverse angle of guide-slot 13, corresponding with the desired taper, is therefore arranged with reference to guide-slot 14, which controls the back-rest, as one is to one and forty-one one-hundredths. If this angle of the walls of the notch, with reference to each other, should be other than ninety degrees, then the relation of the angles of the two guide-slots to each other will be arranged in accordance so that the radial approach of the notch-walls will correspond with the radial approach of the tool point.

A taper turning tool has heretofore been proposed in which a multiple back-rest and a multiple tool were employed in connection with angular guides to give the inward and outward motions to the tools and back-rests for turning tapers, the intention being that long tapers could thus be produced by short guide-ways and short feeding motions. I disclaim such construction as of my invention.

I claim as my invention—

1. In a taper turning tool, the combination, substantially as set forth, of a shank adapted for longitudinal feeding motion upon the work a distance equal to the whole length of taper to be turned, a tool-block mounted upon a slide-way carried by said shank and arranged to move thereon radial to the work to be turned, a narrow notched back-rest block mounted upon a slide-way carried by said shank and arranged to move thereon radial to the work to be turned, and a pair of stationary transversely angular guide-ways engaging said two blocks and controlling their radial movements, and having a length equal to the whole length of taper to be produced.

2. In a taper turning tool, the combination, substantially as set forth, of a shank adapted for longitudinal feeding motion upon the work a distance equal to the whole length of taper to be turned, a tool-block mounted upon a slide-way carried by said shank and arranged to move thereon radial to the work to be turned, a narrow notched back-rest block mounted upon a slide-way carried by said shank and arranged to move thereon radial to the work to be turned, and a pair of stationary transversely angular guide-ways engaging said two blocks and controlling their radial movements and having a length equal to the whole length of taper to be produced, and having differing transverse angles.

3. In a taper turning tool, the combination, substantially as set forth, of a shank adapted for longitudinal feeding motion upon the work a distance equal to the whole length of taper to be turned, a tool-block mounted upon a slide-way carried by said shank and arranged to move thereon radial to the work to be turned, a narrow notched back-rest block mounted upon a slide-way carried by said shank and arranged to move thereon radial to the work to be turned, a pair of stationary transversely angular guide-ways engaging said two blocks and controlling their radial movements, and having a length equal to the whole length of taper to be produced, and screws arranged to alter the transverse relationship between said blocks and their respective guide-ways.

4. In a taper turning tool, the combination, substantially as set forth, of a shank adapted for longitudinal feeding motion upon the work a distance equal to the whole length of taper to be turned, a tool-block mounted upon a slide-way carried by said shank and arranged to move thereon radial to the work to be turned, a narrow notched back-rest block mounted upon a slide-way carried by said shank and arranged to move thereon radial to the work to be turned, and at an angle to the movement of said tool-block, and a pair of stationary transversely angular guide-ways engaging said two blocks and controlling their radial movements, and having a length equal to the whole length of taper to be produced.

5. In a taper turning tool, the combination, substantially as set forth, of a shank adapted for longitudinal feeding motion upon the work to be turned, a tool-block mounted upon a slide-way carried by said shank and arranged to move thereon radial to the work to be turned, a guide-pin carried by said tool-block, a notched back-rest block mounted upon a slide-way carried by said shank and arranged to move thereon radial to the work to be turned, a guide-pin carried by said back-rest block, and a pair of stationary transversely angular longitudinal grooves engaging said two guide pins and controlling their radial movements.

6. In a taper turning tool, the combination, substantially as set forth, of a shank adapted for longitudinal feeding motion upon the work to be turned, a tool-block mounted upon a slide-way carried by said shank and arranged to move thereon radial to the work to be turned, a notched back-rest block mounted upon a slide-way carried by said shank and arranged to move thereon radial to the work to be turned, and a stationary guide-plate having a pair of transversely angular longitudinal guide-grooves engaging said block and controlling their radial movements.

7. In a taper turning tool, the combination, substantially as set forth, of a shank adapted for longitudinal feeding motion upon the work to be turned, a tool-block mounted upon a slide-way carried by said shank and arranged to move thereon radial to the work to be turned, a notched back-rest block mounted upon a slide-way carried by said shank and arranged to move thereon radial to the work to be turned, an adjustable bar carried by each of said blocks and provided with a guide-pin, and a pair of stationary transversely angular guide-ways engaging said guide pins and controlling their radial movements.

8. In a taper turning tool, the combination, substantially as set forth, of a slide-way, a tool-block and a back-rest block mounted independently thereon, and a pair of transversely angular longitudinal guide-ways engaging said blocks, and having a length equal to the whole length of taper to be produced.

ZORESTER B. COES.

Witnesses:
SAM. D. FITTON, Jr.,
J. W. SEE.